(12) United States Patent
Jäckel et al.

(10) Patent No.: US 6,575,838 B2
(45) Date of Patent: Jun. 10, 2003

(54) APPARATUS FOR DAMPING TORSIONAL VIBRATIONS IN THE POWER TRAINS OF MOTOR VEHICLES AND THE LIKE

(75) Inventors: Johann Jäckel, Baden-Baden (DE); Hartmut Mende, Bühl (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 09/917,049

(22) Filed: Jul. 27, 2001

(65) Prior Publication Data

US 2002/0019263 A1 Feb. 14, 2002

(30) Foreign Application Priority Data

Jul. 27, 2000 (DE) ............................ 100 36 503

(51) Int. Cl.[7] ................................................ F16D 3/12
(52) U.S. Cl. ........................................ 464/67; 192/205
(58) Field of Search .......................... 464/24, 66–68, 464/81–85; 192/205

(56) References Cited

U.S. PATENT DOCUMENTS

| | | | | |
|---|---|---|---|---|
| 1,258,639 A | * | 3/1918 | Eaton | 464/66 |
| 1,417,721 A | * | 5/1922 | Eaton | 464/66 X |
| 4,148,200 A | * | 4/1979 | Schallhorn et al. | 464/66 X |
| 5,156,067 A | * | 10/1992 | Umeyama | 464/68 X |
| 5,161,660 A | | 11/1992 | Huber | |
| 5,382,193 A | | 1/1995 | Friedmann et al. | |
| 5,863,253 A | * | 1/1999 | Rohs et al. | 464/66 |
| 2001/0046898 A1 | * | 11/2001 | Rohs et al. | 464/68 |

FOREIGN PATENT DOCUMENTS

| | | | | |
|---|---|---|---|---|
| DE | 730205 | * | 1/1943 | 464/68 |
| DE | 745607 | * | 5/1944 | 464/66 |
| GB | 2262587 | * | 6/1993 | 464/68 |
| NL | 70203 | * | 6/1952 | 464/66 |

* cited by examiner

*Primary Examiner*—Greg Binda
(74) *Attorney, Agent, or Firm*—Darby & Darby

(57) ABSTRACT

Apparatus for damping torsional vibrations, particularly in the power train of a motor vehicle, has first and second torque transmitting devices rotatable with and relative to each other about a common axis against the opposition of a damper having springs confined in an annular chamber of one of the two devices. The extent to which the two devices can turn relative to each other is determined, at least in part, by plastic inserts which are installed in the one device radially inwardly of the chamber and have anvils which abut each other upon completion of a preselected angular displacement of the two devices relative to each other from a neutral position.

29 Claims, 5 Drawing Sheets

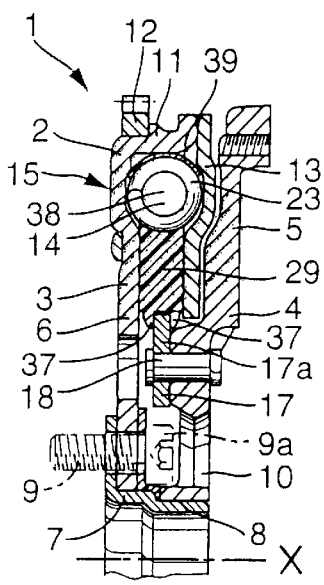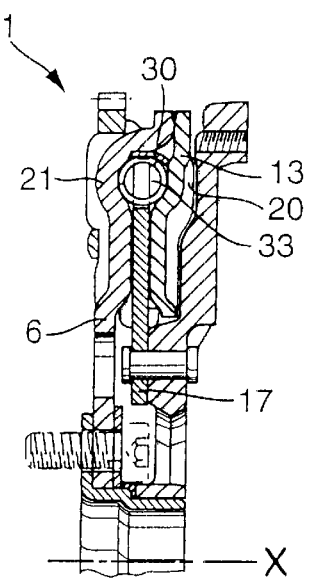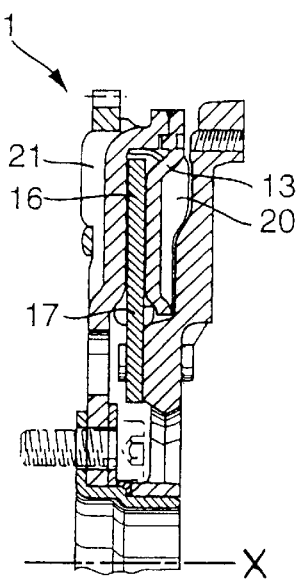
Fig. 2  Fig. 3  Fig. 4
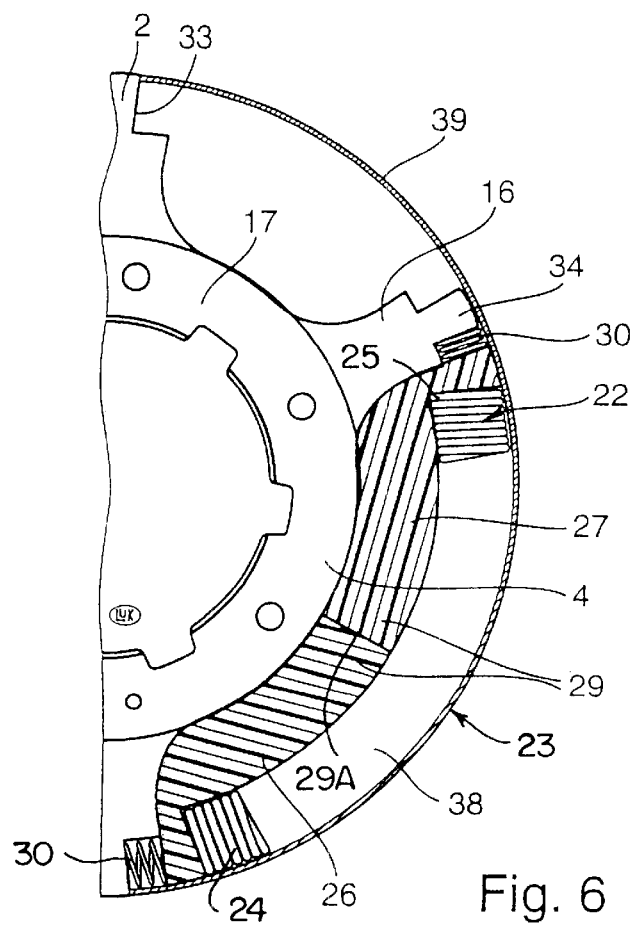
Fig. 6

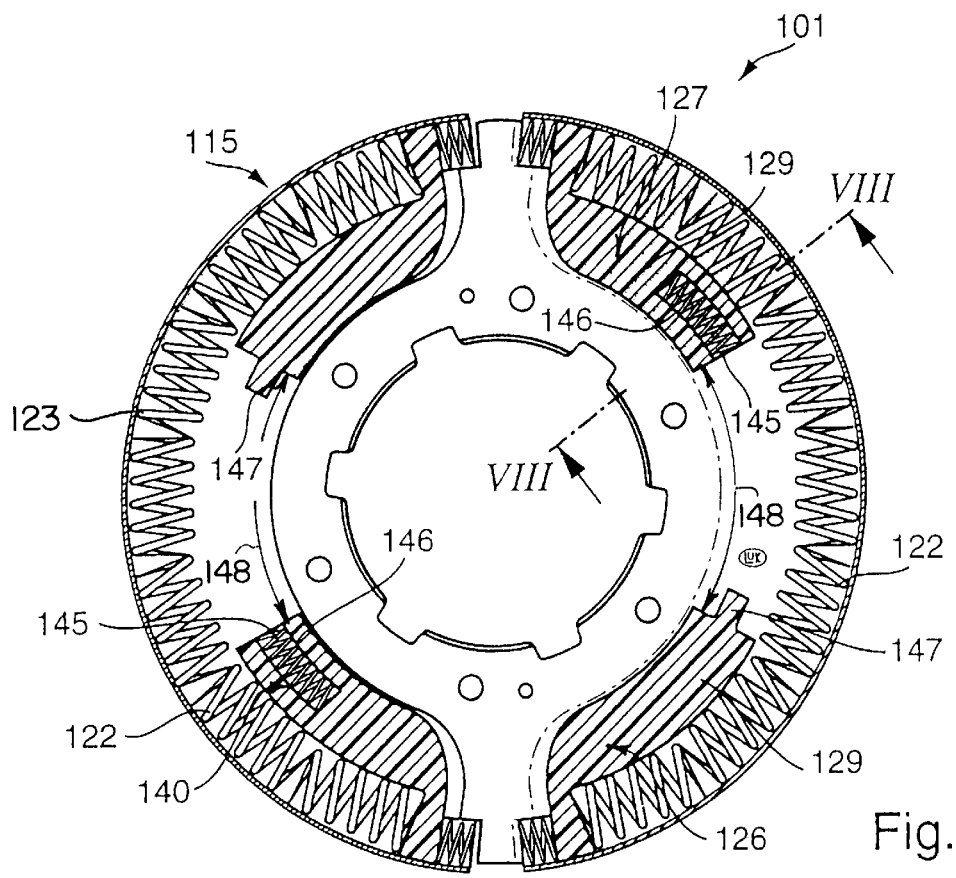
Fig. 7
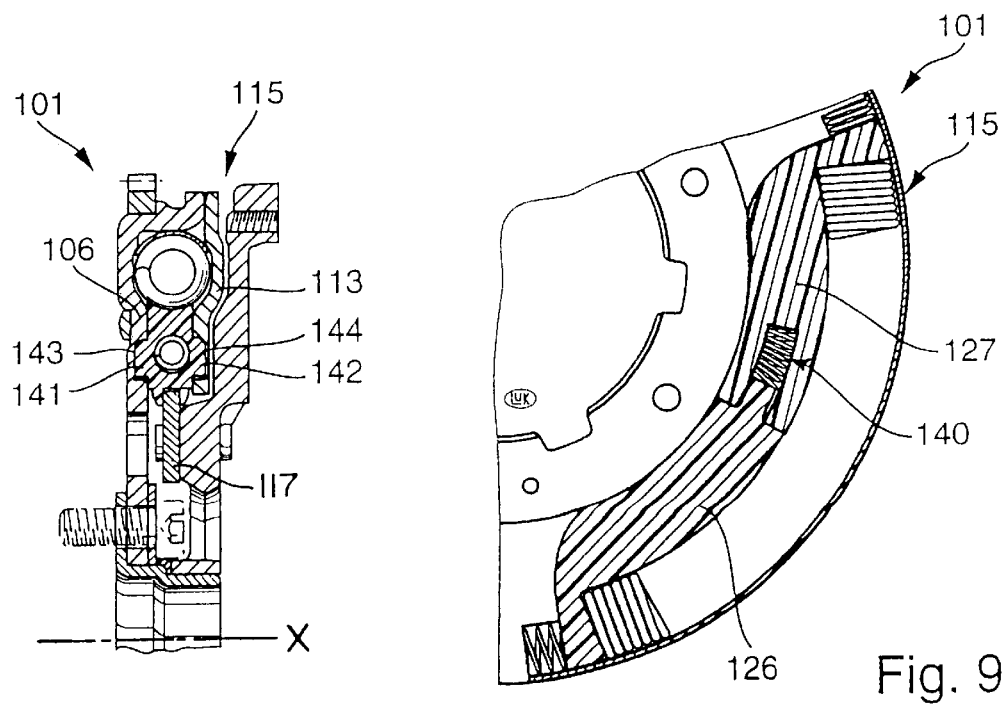
Fig. 8
Fig. 9

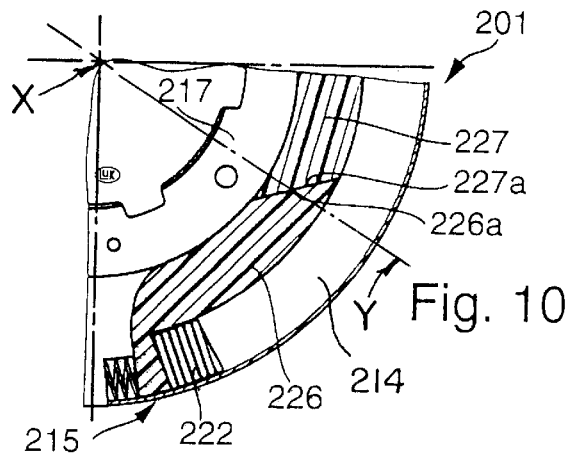
Fig. 10
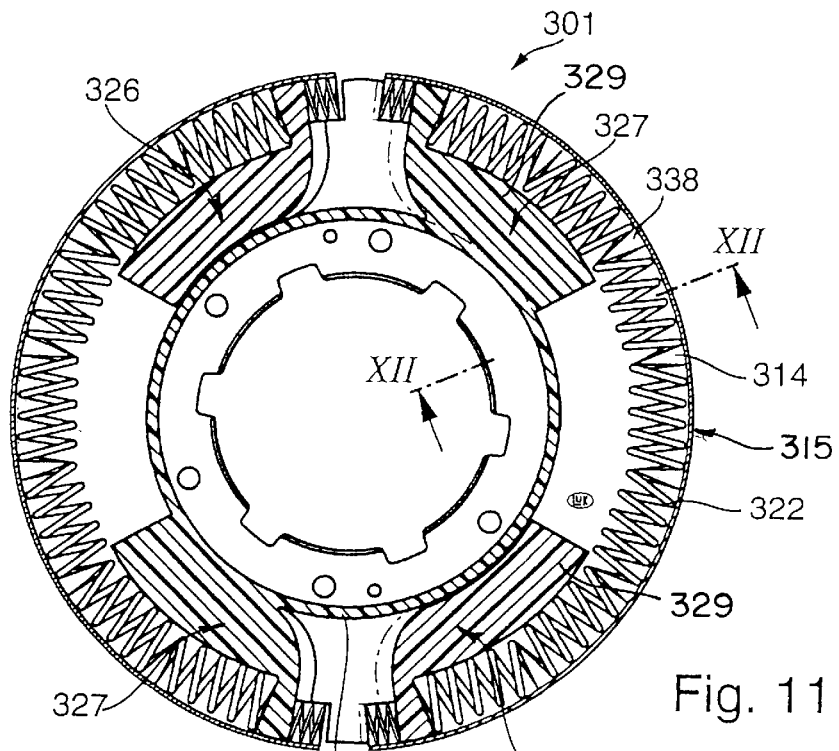
Fig. 11
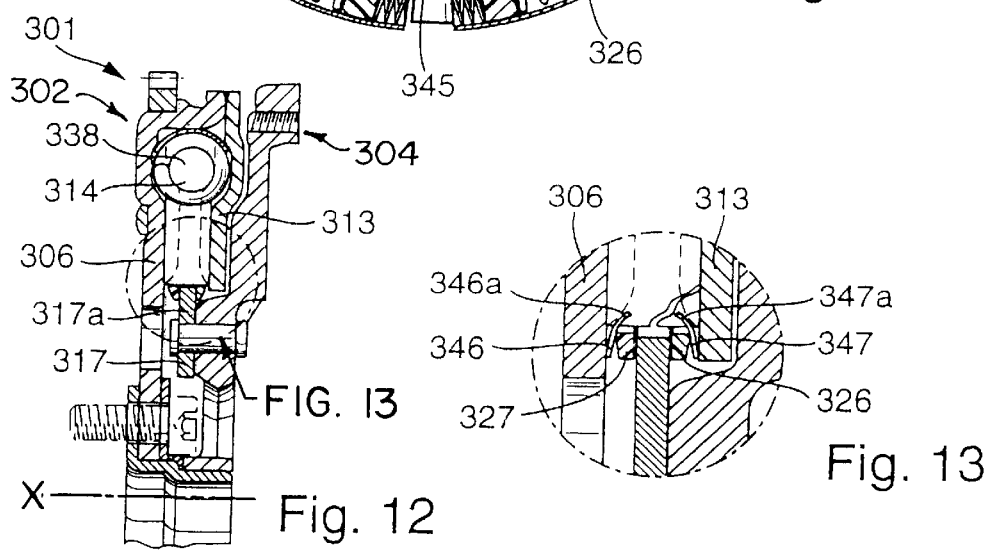
Fig. 12
Fig. 13

ARATUS FOR DAMPING TORSIONAL
VIBRATIONS IN THE POWER TRAINS OF
MOTOR VEHICLES AND THE LIKE

CROSS-REFERENCE TO RELATED CASES

This application claims the priority of commonly owned copending German patent application Serial No. 100 36 503.5 filed Jul. 27, 2000. The disclosure of the above-referenced German patent application, as well as that of each US and foreign patent and patent application identified in the specification of the present application, is incorporated herein by reference.

BACKGROUND OF THE INVENTION

The present invention relates to improvements in apparatus for damping vibrations between rotary driving and driven parts, such as between the output shaft of an engine or another prime mover and the input shaft of a change-speed transmission in the power train of a motor vehicle. As a rule, such apparatus comprise first and second rotary torque transmitting devices and a torque transmitting and stray movements (such as vibrations) suppressing (damping) unit between such devices.

Torsional vibration damping apparatus of the character to which the apparatus of the present invention pertain are disclosed, for example, in published German patent applications Serial Nos. 199 12 970 A1, 199 09 044 A1, 196 48 432 A1, 196 03 248 A1 and 41 17 584 A1. All such parts or groups of parts in the apparatus of the present invention which are adequately disclosed and illustrated in the above-enumerated and other published German patent applications as well as in US and foreign patents granted to the assignee of the present application and/or to others will be described only to the extent necessary to readily locate the relevant references for additional disclosure (if necessary).

Damping apparatus of the type to which the apparatus of the present invention pertain are also disclosed in commonly owned German patent application Serial No. 100 37 107.8, filed Jul. 27, 2000, and in the corresponding copending U.S. patent application Ser. No. 09/915,817, filed Jul. 25, 2001 for "APPARATUS FOR DAMPING TORSIONAL VIBRATIONS".

A drawback of many presently known vibration damping apparatus is that they are not effective under any and all circumstances which arise in torque transmitting machines, assemblies or apparatus, as well as that they are in part too bulky, complex and expensive. Moreover, many (if not all) presently known torsional vibration damping apparatus are overly sensitive to the presence and influence of foreign matter, primarily or frequently because their sensitive constitutents are not adequately shielded against penetration of dust and/or other impurities and/or against uncontrolled escape of lubricant.

OBJECTS OF THE INVENTION

An object of our present invention is to enhance the simplicity and reliability as well as to reduce the initial and maintenance cost of torsional vibration damping apparatus, for example, of apparatus which can be put to use in the power trains of motor vehicles.

Another object of the instant invention is to provide torsional vibration damping apparatus which can be installed in existing power trains of motor vehicles or the like as superior substitutes for conventional apparatus of such character.

A further object of the invention is to provide novel and improved means for reliably confining grease, oil or another suitable lubricant in the enclosure(s) for the torsional vibration damper or dampers of the above outlined apparatus.

An additional object of the invention is to provide novel and improved means for shielding the sensitive constituents of torsional vibration damping apparatus from adverse influences of dust and/or other foreign matter.

Still another object of our present invention is to provide novel and improved seals for use in torsional vibration damping apparatus of the above outlined character.

A further object of the invention is to provide a power train, particularly for use in a motor vehicle, which embodies a torsional vibration damping apparatus of the above outlined character.

Another object of the present invention is to provide a novel and improved apparatus which is designed to transmit torque between the rotary output element of the engine and the rotary input element of the transmission in the power train of a motor vehicle, such as a passenger car, a truck, an SUV and/or others.

A further object of the invention is to provide a torsional vibration damping apparatus which is or which can be constructed and assembled in such a way that it can be readily converted for optimal operation under any one of a host of different circumstances.

An additional object of the invention is to provide novel and improved damper means for use in the above outlined apparatus.

Still another object of the invention is to provide the above outlined apparatus with novel and improved means for reliably coupling various constituents of the apparatus to each other.

A further object of the invention is to provide a novel and improved multi-stage torsional vibration damping apparatus for use in the power trains of motor vehicles and the like.

An additional object of the invention is to provide a novel and improved torsional vibration damping apparatus which can be readily assembled into a module for convenient and time-saving installation in the power train of a motor vehicle.

Another object of the present invention is to provide a novel and improved method of limiting or preventing stray movements of parts which transmit torque between a prime mover and a torque receiving unit, such as in the power train of a motor vehicle.

SUMMARY OF THE INVENTION

One feature of our invention resides in the provision of an apparatus for damping torsional vibrations, particularly in the power train of a motor vehicle (e.g., between the crankshaft or camshaft of the combustion engine or the output shaft of another prime mover and the input shaft of the manual, automated or automatic change-speed transmission). The improved apparatus comprises first and second torque transmitting devices which are turnable with and relative to each other about a common axis and are respectively arranged to normally receive torque from a rotary output element of a driving unit (such as the camshaft or the crakshaft of the aforementioned combustion engine) and to transmit torque to a rotary input element (such as the input shaft of the aforesaid transmission). The improved apparatus further comprises a damper which is constructed, assembled and installed to yieldably oppose rotation of the torque transmitting devices relative to each other and includes elastically deformable energy storing means engageable by suitably configured and/or dimensioned and/or installed portions of the torque transmitting devices, and inserts which are interposed between the aforementioned portions of the torque transmitting devices on the one hand and the energy storing means on the other hand. The inserts have portions or sections (hereinafter called anvils for short) which are arranged to abut each other in response to turning of at least one of the torque transmitting devices relative to the other device through predetermined angles. The energy storing means is disposed at a first radial distance from the common axis of the torque transmitting devices, and the anvils are disposed at a lesser second radial distance from the common axis.

At least one but preferably each of the torque transmitting devices can include at least one flywheel. The arrangement can be such that the improved apparatus comprises first and second flywheels which are rotatable about the common axis of the torque transmitting devices, and means for respectively connecting the first and second flywheels to the first and second torque transmitting devices.

The energy storing means can include at least two arcuate or polygonal (hereinafter often referred to as arcuate) resilient components having centers of curvature at (i.e., on or relatively close to) the common axis of the torque transmitting devices and being arranged to permit the two devices to turn relative to each other clockwise and counterclockwise from a neutral position through angles of at least 30°. The arcuate resilient components can include or constitute coil springs, and the coil springs of at least one of the resilient components can be arranged to undergo expansion and/or contraction.

The energy storing means of the damper can include at least one arcuate resilient component having a series of coil springs which are disposed end-to-end. The at least one arcuate resilient component can constitute or include at least one elongated precurved coil spring.

It is also possible to employ energy storing means which includes at least one set of interfitted coil springs.

At least a portion of at least one of the inserts can consist of a plastic material.

The apparatus can further comprise means for securing the end portions of the energy storing means to the aforementioned portions of the torque transmitting devices against unintentional separation of such devices from the energy storing means.

As already mentioned hereinbefore, the energy storing means of the damper can include a plurality of elongated arcuate resilient components having centers of curvature at the common axis of the torque transmitting devices. The inserts are or can be grouped into pairs, one pair for each resilient component, and the anvils of at least one pair of inserts are inwardly adjacent the respective resilient component of the energy storing means of the damper. The anvils of the at least one pair of inserts can extend along arcuate paths and the anvils of each pair can have a combined length less than the length of the respective resilient component in a condition the at least one component assumes in predetermined starting positions of the torque transmitting devices relative to each other. The inserts of the at least one pair of inserts can further include radially outwardly extending portions which are adjacent the end portions of the at least one coponent of the energy storing means. Each radially outwardly extending portion can exhibit at least some elastic deformability.

The improved apparatus can further comprise additional damper means which is arranged to yieldably oppose turning of the torque transmitting devices relative to each other upon completion of turning of the torque transmitting devices relative to each other through the aforementioned predetermined angles. The damper can have a first spring gradient and the additional damper means can have a higher second spring gradient. Furthermore, or in addition to the just mentioned feature involving the spring gradients, the damper can exhibit a first moment of friction and the additional damper means can exhibit a higher second moment of friction. In accordance with a presently preferred embodiment, the damper has a first spring stiffness and a first moment of friction, and the additional damper means has a second spring stiffness and a second moment of friction; at least one of the second stiffness and the second moment of friction is higher than the corresponding characteristic(s) of the damper. It will be seen that, at least in many instances, the additional damper means exhibits at least one characteristic which is different from the corresponding characteristic of the damper; such at least one characteristic can constitute the stiffness of the additional damper means.

The anvils can be provided with end faces which are disposed in planes including the common axis of the torque transmitting devices. Alternatively, such end faces can constitute ramps which are inclined with reference to the aforementioned planes and abut each other in response to turning of at least one of the torque transmitting devices through the aforementioned predetermined angles. The ramps can be oriented and dimensioned and/or otherwise designed to enhance the damping action of the damper in response to abutment of the respective anvils against each other. In accordance with one presently preferred embodiment, the ramps are oriented to frictionally engage each other as soon as the anvils come into abutment with each other.

The anvils can be installed with at least some freedom of movement radially of the common axis of the torque transmitting devices so that they can bear upon the energy storing means of the damper under the action of centrifugal force in response to turning of the torque transmitting devices about their common axis.

Alternatively or in addition to the just discussed feature, the inserts can be arranged to bear upon at least one of the torque transmitting devices under the action of centrifugal force in response to turning of such devices about their common axis.

Still further, the anvils can be arranged to bear upon at least one of the energy storing means, the first torque transmitting device, and/or the second torque transmitting device under the action of centrifugal force in response to turning of the torque transmitting devices about their common axis.

One of the torque transmitting devices can comprise two axially spaced-apart sidewalls extending at least substantially radially of their common axis, and the other torque transmitting device can comprise a third wall or partition disposed between the two sidewalls. The one torque transmitting device is or can constitute the first torque transmitting device, i.e., the device which normally transmits torque to the second device by way of the damper. The arrangement can be such that the anvils bear upon at least one of the walls (i.e., upon at least one of the sidewalls and/or upon the third wall) under the action of centrifugal force in response to turning of the energy storing devices about their common axis.

The inserts can be arranged to establish a frictional engagement with the first torque transmitting device, with the second torque transmitting device and/or with the damper, and to thus generate a frictional damping action, at least in response to turning of the torque transmitting devices relative to each other. Such apparatus can further comprise at least one spring which is arranged to urge the inserts against the first torque transmitting device, against the second torque transmitting device and/or against the damper and to thus establish and maintain the aforementioned frictional damping action. The at least one spring can include or constitute at least one diaphragm spring (also called Belleville spring).

If at least one of the torque transmitting devices includes at least one flywheel which is rotatable about the common axis of the torque transmitting devices, at least one of the inserts can be arranged to oppose wobbling of the flywheel (s), e.g., to oppose wobbling of two coaxial flywheels relative to the common axis of the torque transmitting devices.

One of the torque transmitting devices can be designed to define an annular chamber for the energy storing means of the damper, and such apparatus can further employ a supply of lubricant (such as grease) which at least partially fills the chamber. The anvils of the inserts in such apparatus can include portions which constitute seals (or at leas partial seals) against the escape of lubricant from the chamber and/or against penetration of dust and/or other contaminants into the chamber.

If the energy storing means includes one or more coil springs, the improved apparatus can further comprise means for opposing rotation of at least one coil spring or each coil spring about its longitudinal axis.

As a rule, or at least in many embodiments of the improved apparatus, the torque transmitting devices are turnable relative to each other about their common axis in clockwise as well as counterclockwise directions. The energy storing means of this apparatus can include a plurality of springs which are arranged end-to-end; such springs can include at least one first spring having a first spring rate and being arranged to store energy in response to clockwise turning of the torque transmitting devices relative to each other, and at least one second spring which has a second spring rate and is arranged to store energy in response to counterclockwise turning of the torque transmitting devices relative to each other.

The energy storing means of the damper can include at least two arcuate resilient components, and the inserts of the apparatus employing such damper can further include portions disposed between the resilient components. The aforementioned portions of the torque transmitting devices preferably include extensions which are disposed between the resilient components, and such apparatus preferably further comprises auxiliary springs which are disposed between the extensions and the portions of the inserts. Such apparatus can further comprise means for securing the auxiliary springs to the aforediscussed portions of the inserts; the securing means can include form-locking connections. The torque transmitting devices of the just described embodiment of the improved apparatus are or can be turnable relative to each other in clockwise and counterclockwise directions, and the auxiliary springs can be arranged to store energy in response to turning of the torque transmitting devices relative to each other in the clockwise or counterclockwise direction. It is also possible to design the apparatus in such a way that at least one first auxiliary spring is arranged to store energy in response to clockwise turning of the torque transmitting devices relative to each other and at least one second auxiliary spring is arranged to store energy in response to counterclockwise turning of the torque transmitting devices relative to each other.

Another feature of the present invention resides in the provision of a torsional vibrations damping apparatus which comprises first and second torque transmitting devices turnable at least within limits relative to each other about a common axis, and means for yieldably opposing turning of the devices relative to each other; such opposing means includes at least one energy storing means and at least one hysteresis arrangement.

The apparatus preferably further comprises inserts which are interposed between portions of the torque transmitting devices one the one hand and the at least one energy storing means on the other hand. The inserts are provided with anvils which are arranged to abut each other in response to turning of at least one of the torque transmitting devices relative to the other device through predetermined angles.

The at least one energy storing means is disposed at a first radial distance from the common axis of the torque transmitting devices, and the anvils are disposed at a lesser second radial distance from such axis.

The novel features which are considered as characteristic of the invention are set forth in particular in the appended claims. The improved torque transmitting apparatus itself, however, both as to its construction and the modes of assembling, installing and operating the same, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIG. 2 is a fragmentary axial sectional view as seen in the direction of arrows from the line II—II in FIG. 1 and shows the cross-sectional outline of the anvil of one of the inserts as well as the outlines of the adjacent portions of the two torque transmitting devices;

FIG. 3 is a fragmentary axial sectional view as seen in the direction of arrows from the line III—III of FIG. 1 and illustrates certain details of an auxiliary spring arrangement which serves to operate in series with energy storing means of the primary damper between the two torque transmitting devices;

FIG. 4 is a fragmentary axial sectional view as seen in the direction of arrows from the line IV—IV in FIG. 1 and illustrates the manner in which a substantially washer-like partition or wall of the second torque transmitting device is received between the sidewalls of the first torque transmitting device;

FIG. 6 illustrates a portion of the structure shown in FIG. 1 but with the two torque transmitting devices shown in their end positions relative to each other in which the anvils of the two pairs of anvils (only one pair can be seen in FIG. 6) abut against each other;

FIG. 7 is a view similar to that of FIG. 1 but showing four different inserts forming part of a second apparatus, the two torque transmitting devices of the second apparatus being shown in their starting positions corresponding to those of the devices shown in FIG. 1;

FIG. 8 is a fragmentary axial sectional view as seen in the direction of arrows from the line VIII—VIII shown in FIG. 7;

FIG. 9 shows a portion of the structure which is illustrated in FIG. 7 but with the modified anvils (only two shown) in positions of abutment with each other;

FIG. 10 shows a portion of a third torque transmitting apparatus, with the anvils of two of the inserts shown in positions of frictional engagement with each other;

FIG. 11 illustrates a fourth apparatus in a view similar to that of FIG. 1 or 7;

FIG. 12 is a fragmentary axial sectional view as seen in the direction of arrows from the line XII—XII shown in FIG. 11;

FIG. 13 is an enlarged view of a detail within the phantom-line circle XIII shown in FIG. 12;

DESCRIPTION OF PREFERRED EMBODIMENTS

Figure 1:
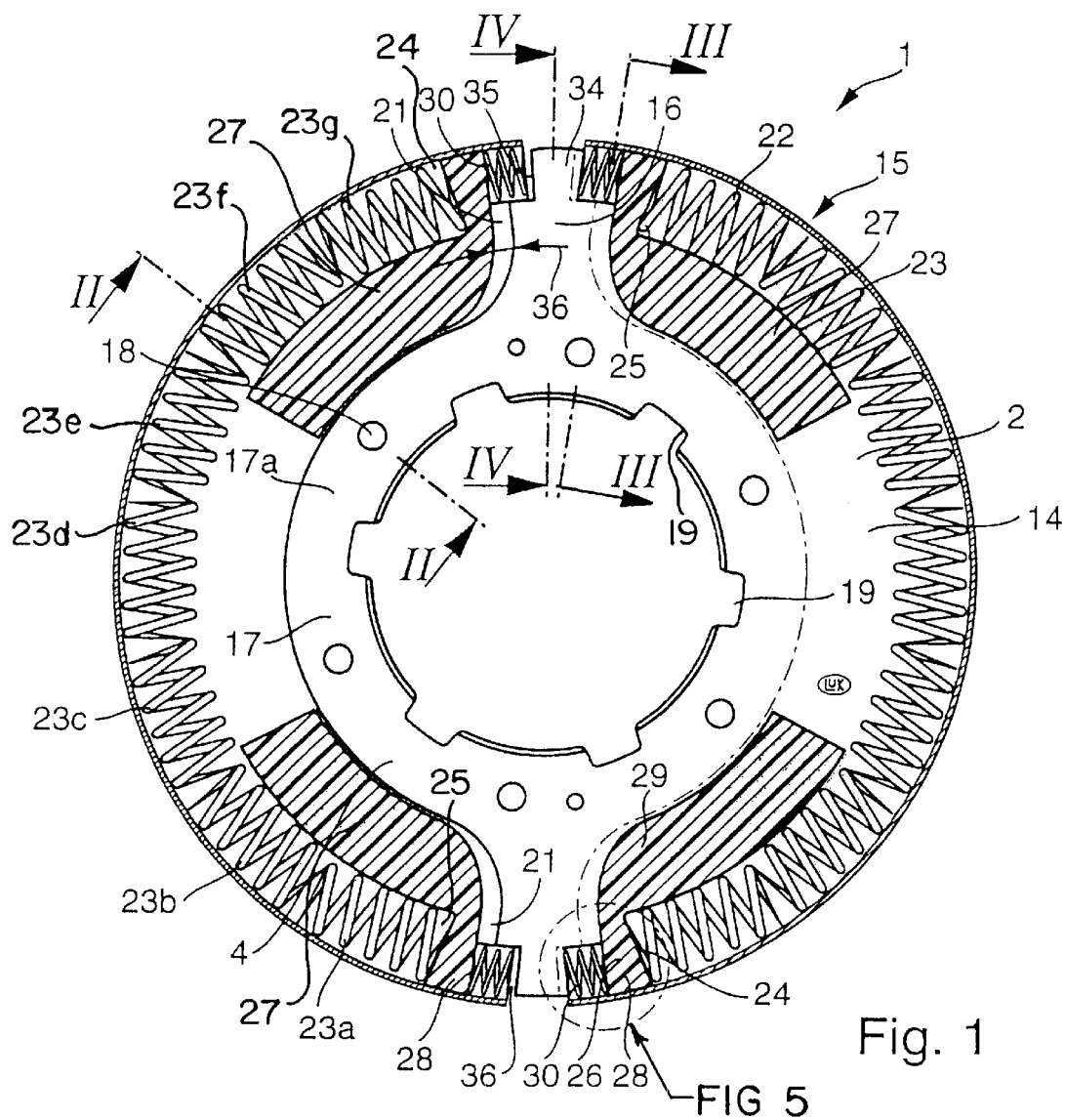
FIG. 1 is a transverse sectional view of a torsional vibration damping apparatus which embodies one form of the present invention and comprises four inserts, the two torque transmitting devices of the apparatus being shown in their starting positions in which the energy storing means of the damper between the two devices store minimal amounts of energy.

The apparatus 1 which is shown in FIGS. 1 to 6 comprises a first rotary torque transmitting device 2 including a composite flywheel or mass 3, a second rotary torque transmitting device 4 which is rotatable with and relative to the device 2 about a common axis X, and a torsional vibration damper 15 which yieldably opposes rotation of the devices 2, 4 relative to each other. More specifically, the damper 15 opposes clockwise and counterclockwise angular movements of the devices 2, 4 relative to each other from starting or initial positions shown in FIG. 1. The device 2 normally receives torque from the rotary output element of a suitable prime mover (e.g., from the crankshaft or camshaft of the combustion engine in the power train of a motor vehicle), and the device 4 normally transmits torque to the input element of a torque receiving unit (e.g., the input shaft of a change-speed transmission in the power train of a motor vehicle). As a rule, the device 4 transmits torque to the change-speed transmission by way of a suitable friction clutch.

The apparatus 1 is a so-called twin-mass or double-mass flywheel assembly. This apparatus constitutes an improvement over and a further development of twin-mass flywheels of the type disclosed, for example, in published German patent applications Serial Nos. 197 28 422 A1, 196 03 248 A1, 195 22 718 A1, 41 17 582 A1, 41 17 581 A1 and 41 17 579 A1. Inventions of the type disclosed in the present application belong to the International Classes F16D13/ . . . and F16F15/ . . . .

The flywheel or mass 3 of the first torque transmitting device 2 includes a first sidewall 6 which extends at least substantially radially of the axis X and the radially inner portion of which is connected with a hub 7. The latter is surrounded by a friction bearing 8 which, in turn, rotatably mounts the mass 5 of the second torque transmitting device 4. Bearings of the type suitable for use at 8 in the apparatus 1 of FIGS. 1 to 6 are disclosed, for example, in published German patent applications Serial Nos. 198 34 728 A1 and 198 34 729 A1. It is also possible to employ one or more antifriction bearings; reference may be had, for example to the aforementioned commonly owned German patent application Serial No. 100 37 107.8 and the corresponding U.S. patent application Ser. No. 09/915,817, filed Jul. 25, 2001.

In the apparatus 1 of FIGS. 1 to 6, the sidewall 6 and the hub 7 constitute two separately produced parts which are mechanically secured to each other by an annular array of threaded fasteners 9 (only one shown in each of FIGS. 2 to 4) which preferably further serve as a means for fixedly but separably securing the parts 6, 7 (and hence the entire apparatus 1) to the aforementioned rotary output element of the prime mover. It is equally within the purview of the present invention to employ a first torque transmitting device (replacing the device 2) wherein the sidewall 6 is of one piece with the hub 7. It will be noted that the fasteners 9 are disposed radially outwardly of the bearing 8, and their heads 9a are accessible through suitably dimensioned and configurated windows 10 provided in the radially innermost portion of the flywheel 5 of the second torque transmitting device 4. The windows 10 render it possible to rapidly affix a fully assembled module constituting the apparatus 1 to the output element of the prime mover or to rapidly detach the module from the output element.

The radially outermost portion of the sidewall 6 is provided with a cylindrical axial extension 11 which carries a second sidewall or cover 13. The latter is substantially parallel to the sidewall 6 and is inwardly adjacent the flywheel 5 of the second torque transmitting device 4. In the embodiment of FIGS. 1 to 6, the extension 11 is of one piece with the sidewall 6 and carries a starter gear 12. The parts 6, 11, 13 of the flywheel 3 define and at least partially seal an annular chamber 14 which accommodates at least a major part of the torsional vibration damper 15. At least the radially outer part of the annular chamber 14 is filled with a lubricant, e.g., with grease. This radially outermost part of the chamber 14 is denoted by the character 38 and receives the annular energy storing means 22 of the damper 15. The input of the damper 15 includes a set of pairwise arranged circumferentially spaced apart profiled portions or projections 37 in the sidewalls 6, 13, and the output of this damper includes fingers or arms 16 extending radially outwardly of a circumferentially complete annular radially inner section forming part of an annular washer-like partition or third wall 17 which is riveted (at 18) to the flywheel 5 of the second torque transmitting device 4. It is also possible to weld the partition 17 to the device 4 or to make the flywheel 5 of the latter of one piece with the partition 17.

As can be seen in FIG. 1, the radially innermost portion of the partition 17 is provided with radially outwardly extending radially inwardly open recesses 19 each of which can receive at least a portion of the head 9a of the adjacent fastener 9.

FIG. 1 shows the torque transmitting devices 2 and 4 of the improved apparatus in their neutral positions, i.e., when the energy storing means 22 of the damper 15 is subjected to minimal stresses and the damper is not called upon to transmit torque from the device 2 to the device 4 or vice versa. The arms 16 of the third wall or partition 17 are located midway between the adjacent abutments 21, 20 (see FIGS. 3 and 4) respectively provided on the sidewalls 6 and 13. In the embodiment of FIGS. 1 to 6, the abutments 21, 20 are integral parts of the respective sidewalls 6, 13 and are obtained as a result of axial displacement of selected portions of the originally more or less flat sidewalls.

As can be seen in FIG. 1, the widths of the arms 16 (as seen in the circumferential direction of the chamber 14 and the extension 11) is less than that of the means for changing the bias of the coil springs which form part of the energy storing means 22. The latter comprises two elongated composite arcuate coil springs 23 each of which extends (in the radially outermost portion 38 of the chamber 14) along an arc of at least 90° but at least slightly less than 180°, e.g., along an arc of between 90° and 160°, preferably 150°.

As can be seen in FIG. 1, each composite coil spring 23 consists of seven discrete coil springs 23a to 23g which are disposed in series, i.e., end-to-end. The individual coil springs 23a to 23g can be straight (i.e., they can have straight longitudinal axes) or they can be imparted an arcuate shape prior to insertion into the radially outermost portion 38 of the annular chamber 14. It is presently preferred to employ composite coil springs (23) having between two and eight discrete coil springs, depending (among others) upon the number of composite coil springs 23. It is also possible to employ composite coil springs (23) wherein at least one of the discrete coil springs (for example 23a or 23b . . . or 23g) comprises at least two coaxial coil springs one of which is confined in the other. Reference may be had, for example, to U.S. Pat. No. 5,161,660 granted Nov. 10, 1992 to Huber for "CLUTCH PLATE WITH PLURAL DAMPERS". Such energy storing means can be resorted to with considerable advantage when the damper employs inserts between individual coil springs (such as 23a to 23g) of at least one composite coil spring. In this respect, reference should be had to published German patent applications Serial Nos. 41 24 614 Al and 41 28 868 A1.

It is often advisable to assemble one or more composite coil springs (23) in such a way that the individual coil springs (such as 23a–23g) can belong to at least two categories each of which contains one or more coil springs having different stiffnesses (rigidities). The arrangement can be such that, when the apparatus (1) employing composite energy storing means (22) is subjected to stresses developing while the motor vehicle employing such apparatus is coasting, the coil springs having lower rigidities are subjected to a pull but another part of such energy storing means includes at least one coil spring having a higher rigidity or a higher gradient and being subjected to push. It is further possible to assemble at least one composite spring (23) of the energy storing means 22 in such a way that it comprises a series of discrete springs (23a . . . 23g) having successively higher resistances to deformation and being distributed in such a way that, starting at the pull side or end of a composite coil spring, successive discrete coil springs have decreasing rigidities, i.e., that the spring having the lowest rigidity is located at the push or coasting side or end of the composite spring.

However, it is also possible (and often highly advisable) to reverse the sequence of springs exhibiting progressively higher or lower rigidities, or to arrange the individual springs of a composite spring in such a way that, starting at one end of a composite spring, a spring exhibiting a higher rigidity is followed by a spring exhibiting a lower rigidity which, in turn, is followed by a spring having a higher rigidity, and so forth. Alternatively, and starting again at one end of a composite spring, a first discrete spring having a lower rigidity or stiffness is followed by a discrete spring having a higher rigidiy which, in turn, is followed by a spring having a lower rigidity, and so forth.

Still further, it is possible to employ composite energy storing means wherein certain coil springs of at least one composite coil spring contain inserts (plugs) of rubber or other suitable elastomeric material. For example, at least one discrete coil spring of a sequence of two or more coil springs in a composite spring can contain an insert or plug of rubber or other suitable elastic material; such insert can perform the additional function of coupling two or more successive coil springs (or other suitable springs) to each other. The just mentioned elastic inserts can be replaced with components which need not extend into (or need not be completely confined in) one or more neighboring coil springs but merely serve to couple such springs to each other.

In the embodiment of FIGS. 1 to 6, the end convolutions 24, 25 of each composite coil spring 23 are adjacent a radially outwardly extending portion 26 of an insert 27 the arcuate major part (29) of which is inwardly adjacent the respective coil springs 23a, 23g. Each portion 26 is disposed between an end convolution 24 or 25 and the abutment 20 or 21 of the wall 13 or 6. The inserts 27 can be made of a suitable plastic material, such as polyamide or another substance which exhibits (a) a satisfactory resistance to wear and/or (b) other desirable mechanical properties (such as the ability to stand elevated temperatures, the ability to stand pronounced compressive stresses and/or a required degree of elasticity). At least one of the just enumerated characteristics (particularly the elasticity) can be enhanced and/or otherwise modulated by appropriate shaping of the inserts 27.

It is often sufficient to provide an insert 27 only at one end convolution (24 or 25) of each composite coil spring 23. The configurations and/or other characteristics of the inserts 27 are preferably selected in such a way that they do not affect the balance (equilibrium) of the parts within the apparatus 1, i.e., that they do not cause the apparatus to develop imbalance due to the presence and/or the characteristics of the inserts 27.

Figure 5:
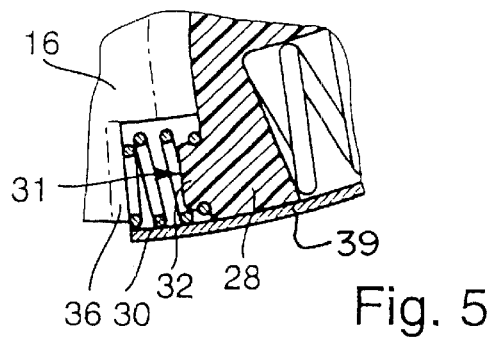
FIG. 5 is an enlarged view of a detail within the phantom-line circle V shown in FIG. 1.

As can be seen in FIGS. 1, 5 and 6, the radially outwardly extending parts 28 of the radially outwardly extending portions 26 of the inserts 27 extend to an annular wear-resistant shield 39 which is installed in the radially outermost portion or section 38 of the annular chamber 14 and is or can be contacted by the radially outermost parts of the coil springs 23a–23g, e.g., under the action of centrifugal force. The major parts 29 of the inserts 27 can be said to constitute anvils or rams each of which has an arcuate shape and is located radially inwardly of at least some coil springs 23a–23g of each composite coil spring 23. FIG. 1 shows four at least substantially identical inserts 27 each having an anvil or ram 29 extending along two coil springs 23a, 23b or 23f, 23g. However, it is equally within the purview of the present invention to utilize inserts 27 having anvils or rams 29 of different lengths, as long as the combined length of each pair of anvils is less than the length of the composite coil spring 23 when the devices 2, 4 are in the starting or initial position relative to each other.

FIGS. 1, 5 and 6 further show that the apparatus comprises auxiliary or secondary resilient elements in the form of coil springs 30 each of which is separated from the end convolution 24 or 25 of a composite coil spring 23 by the portion 26 of an insert 27. Each coil spring 30 can be replaced by two or more coil springs and/or other suitable auxiliary energy storing elements. Furthermore, the apparatus 1 can be provided with auxiliary energy storing elements 30 or the like which are active only when the apparatus acts to apply a pulling force or a pushing force.

As can be seen in FIG. 5, the auxiliary energy storing element 30 which is shown therein is secured to the end portion 26 of the adjacent insert 27 so that it cannot be accidentally (unintentionally) separated therefrom. The illustrated connection is a form-locking connection which is denoted by the character 31 and includes an extension 32 forming part of the end portion 27 and is provided with an undercut or recess for the adjacent end convolution of the energy storing element 30. The latter reacts against a stop 33 on the adjacent portion of the sidewall 13. It is clear that the stop 33 can be provided on the sidewall 6 or that each of the sidewalls 6, 13 can carry a stop 33 for the adjacent coil spring 30. Furthermore, at least one of these sidewalls can be designed to guide the adjacent coil spring 30 in the radial and/or axial direction of the apparatus 1.

The radially outwardly extending arms 16 of the partition 17 are provided with narrowed extensions or constrictions 34 each causing the respective arm 16 to exhibit at least one shoulder 35. At least a portion of each coil spring 30 is engaged by one or more shoulders 35. The configuration of each arm 16 (as seen in at least one of the clockwise and counterclockwise directions, i.e., in the direction of expansion or contraction of the adjacent composite coil springs 23) is such that there is provided a clearance 36 for a coil spring 30. Such clearances ensure that the secondary coil springs 30 undergo a certain amount of compression (stressing) prior to start of stressing of the adjacent composite coil springs 23. Thus, the arms 16 reach the adjacent end portions 26 of the inserts 27 only after the secondary coil springs 30 have undergone a certain amount of stressing, i.e., subsequent to elimination of the clearances or plays 36. The inserts 27 begin to move circumferentially of the annular chamber 14 when their portions 26 are actually reached and displaced by the respective arms 16 of the partition 17.

In the apparatus 1 of FIGS. 1 to 6, the constriction (narrowed extension) 34 of each arm 16 is somewhat narrower than a stop 33 (as seen in the circumferential direction of the annular chamber 14). This ensures that the torque transmitting devices 2 and 4 have a certain freedom of angular movement relative to each other (from their starting positions shown in FIG. 1) without being compelled to cause the energy storing means 22 and 30 to store energy (i.e., while the energy storing means 22 and 30 are inactive). This ensures that the frictional damping action (hysteresis) developed by the apparatus 1 during the just mentioned initial stage of angular movement of the torque transmitting devices 2 and 4 is zero or close to zero. The extent of angular movability of the torque transmitting devices 2 and 4 relative to each other from the starting positions of FIG. 1 (without stressing the energy storing means 22 and 30) is shown at 36.

FIG. 6 shows that the maximum extent of angular movability of the torque transmitting devices 2 and 4 relative to each other which is permitted by the damper 15 is determined by the anvils 29 of two neighboring inserts 27. The anvils 29 of the two fully illustrated inserts 27 actually abut each other (at 29A).

FIG. 2 illustrates that the circumferentially extending arcuate anvils 29 of the inserts 27 are received between the radially extending sidewalls 6 and 13 of the torque transmitting device 2 in such a way that the anvils are confined to movement in a circumferential direction but are held in predetermined positions as considered axially of the apparatus 1. FIG. 2 merely shows a single insert 27 but the mounting of the other three inserts is or can be the same. Predictable guidance of the inserts 27 (against undesirable wobbling and/or other movements in the axial direction of the apparatus 1) is ensured by imparting to the anvil 29 of each insert 27 a thickness (as measured in the direction of the axis X) which equals or closely approximates the axial spacing between the neighboring portions of the sidewalls 6 and 13 from each other.

At least the radially inner portions of the anvils 29 are provided with profiles 37 (see FIG. 2) which at least partially overlap the circumferentially complete radially inner portion 17a of the disc-shaped partition 17 on the device 4.

It is often desirable to select the configurations of the inserts 27 and of adjacent parts (especially the sidewalls 6 and 13) in such a way that they reduce the extent of or prevent any wobbling movements of the flywheels 3 and 5 relative to each other; this reduces the stressing and prolongs the useful life of the bearing 8. Furthermore, it is presently preferred to design the inserts 27 in such a way that they constitute a complete or a substantially complete seal for the portion 38 of the annular chamber 14 (namely for that portion which receives the coil springs 27). The sealing action is or can be twofold, i.e., the inserts 27 should prevent entry of dust and/or other contaminants into the portion 38 of the annular chamber 14, and such inserts should also reduce the likelihood of escape of grease and/or other suitable lubricant from the portion 38.

When the anvils 29 of the inserts 27 are being acted upon by centrifugal force, they can bear upon the radially innermost portions of convolutions of the composite coil springs 23. This causes the coil springs 23 to bear upon the inner sides of the arcuate wear-resistant shields 39 which are installed radially inwardly of the cylindrical radially outermost portion 11 of the sidewall 6. The configuration of the shields 39 and of the structure including the sidewalls 6, 13 and the cylindrical portion 11 can be such that these parts cooperate to hold the composite coil springs 23 against excessive (undesirable) movements in a direction away from the axis X as well as in the direction of such axis.

It is often preferred to select the mode of cooperation between the individual coil springs 23a–23g of all composite coil springs 23 and the anvils 29 of the inserts 27 in such a way that the centrifugal forces acting upon the inserts 27 are not transmitted or applied to the coil springs. One such embodiment of the improved apparatus will be described with reference to FIGS. 7 to 9.

The auxiliary or secondary springs 30 are or can be constructed and installed in such a way that they do not store any energy or any appreciable amounts of energy when the apparatus 1 rotates about the axis X, except when they are called upon to perform their desired functions. This ensures that changes of load or stress (such as those which cause a change of the direction of rotation of the torque transmitting devices 2 and 4 relative to each other, i.e., from clockwise to counterclockwise or vice versa), do not entail any, or any appreciable, prestressing of the coil springs 30 so that such springs can resile in the desired optimum manner in response to the application of stresses. Such mode of installation and operation of the coil springs 30 is particularly desirable when the motor vehicle embodying the apparatus 1 is caused to shift from pull to push. In the absence of the just described features of the springs 30, each shifting from pull to push could cause the development of noise as a result of impacting of neighboring parts against each other and/or rumbling noises which could develop as a result of vibratory movements of component parts in the improved apparatus.

Still another important advantage of the inserts 27 is that they can intercept very pronounced peak torques which often constitute a high multiple of nominal torques and are known as or often called impact torques. If the inserts 27 are made of a plastic material, especially a material which exhibits a certain amount of elasticity in the circumferential direction of the apparatus 1, one can prevent the development of pronounced metal-to-metal impacts or reduce the intensity of such impacts. The partition 17 and its arms 16 are designed (with reference to the inserts 27) in such a way that the aforementioned pronounced torque is transmitted from the partition 17 directly to the inserts 27 so that such pronounced torque need not be taken up by the auxiliary springs 30.

The utilization of inserts 27 as a means for intercepting pronounced peak torques exhibits the additional advantage that one can resort to an even more satisfactory design and mounting of the coil springs 23a–23g which, in the embodiment of FIGS. 1 to 6, together constitute the energy storing means 22.

A further important advantage of the apparatus 1 is that the energy storing means 22 (which, in this embodiment of the present invention, comprises two components 23 capable of undergoing at least one form of deformation, particularly elastic deformation) can be placed at a substantial radial distance from the axis X and radially outwardly of the anvils 29 of the inserts 27. These inserts are carried by the torque transmitting devices 2, 4 and are deformable by the arms 16 of the partition (third wall) 17 as well as by the abutments 20, 21 of the respective sidewalls 13, 6. The anvils 29 of each pair of neighboring inserts 27 are caused to strike against each other radially inwardly of the respective components 23 of the energy storing means 22 in response to turning of the torque transmitting devices 2 and 4 relative to each other through predetermined angles (see the angles 449, 450 shown in FIG. 14).

The utilization of energy storing means 22 having a large radius of curvature is desirable because this renders it possible to employ anvils 29 which are disposed at a substantial distance from the axis X without necessitating an enlargement of the diameter of the apparatus 1. Furthermore, it is possible to employ energy storing means having a large energy storing capacity, i.e., a parameter which is proportional to the circumferential length of the energy storing means.

The feature that at least one of the torque transmitting devices 2 and 4 includes or forms part of a flywheel (3 and 5), i.e., that the apparatus includes or forms part of a twin-mass flywheel, enhances the utility of the improved apparatus 1. In this connection, reference should be had to the disclosures of some or all of the US and foreign patents and patent applications identified in the preceding and following passages of this specification.

As already mentioned hereinbefore, the dimensions and mounting of the energy storing means 22 are or can be such that the torque transmitting devices 2, 4 can turn relative to each other (clockwise and/or counterclockwise) through angles of at least 30° as measured from the starting angular positions shown in FIG. 1. The torque transmitting devices 2 and 4 turn relative to each other in one of the two directions when the prime mover of a motor vehicle embodying the apparatus 1 drives the torque transmitting device 2, and the devices 2 and 4 turn relative to each other in the other of the two directions when the prime mover acts as a brake, i.e., when the inertia of the moving vehicle causes the wheels to drive the torque transmitting device 2 by way of the device 4, the partition 17 and the damper 15.

It is often desirable to select the dimensions of the energy storing means 22 in such a way that the ratio of outer diameters of the coil springs 23a–23g to the axial length of the energy storing means is between 1:6 and 1:20. The rigidity (stiffness) of the damper 15 (i.e., the resistance of energy storing means 22 to turning of the torque tansmitting devices 2 and 4 relative to each other) can be in the range of between 1 and 6 Nm/°, at least at the outset of compression of the resilient elements constituting the energy storing means. Of course, such rigidity increases (or can increase) in response to turning of the torque transmitting devices 2 and 4 away from their initial or starting angular positions relative to each other.

The coil springs 23a–23g of the energy storing means 22 are or can be mounted in such a way that they can be caused to pull one of the torque transmitting devices 2, 4 in response to angular movement of the other of these devices or to push the other device in response to turning of the one device.

The utilization of elongated one-piece springs (e.g., of coil springs each having an axial length corresponding to the combined axial lengths of the coil springs 23a–23g) or of composite springs (such as the coil springs 23) depends upon the circumstances under which the apparatus 1 is or is expected to be put to use. The same applies for the utilization of composite springs of the type wherein two or more coil springs are confined in (i.e., fitted into) each other.

The coil springs 23a–23g can constitute springs having straight longitudinal axes. However, and as shown (for example) in FIG. 6, it is also possible to employ arcuate coil springs having centers of curvature on or at the axis X of the apparatus 1. The utilization of precurved coil springs (or equivalent springs) contributes to simplicity of assembly of the improved apparatus. It is also possible to employ arrays of coil springs or other types of springs including springs having straight and springs having curved longitudinal axes. The apparatus 1 can be assembled (at least in part) prior to installation in the power train of a motor vehicle or elsewhere.

In many respects, the apparatus 101 which is shown in FIGS. 7 to 9 is constructed and assembled and operates in the same way as the apparatus 1 of FIGS. 1 to 6. An important difference between these apparatus is that the inserts 126, 127 of the apparatus 101 are held against the action of centrifugal force in a manner such that they exert no force or no appreciable force upon the energy storing means 122 of the damper 115. Another difference is that, prior to actual or full impact of the anvils 129 against each other, such anvils must compress or stress further energy storing elements 140 here shown as constituted by or including coil springs 145. Each coil spring 145 is preferably set up and designed to be capable of taking up pronounced compressive stresses.

FIG. 7 shows the apparatus 101 in the starting or initial position, analogous to FIG. 1. From the starting position, the inserts 126, 127 have to travel an angular distance 148 towards each other before their anvil portions will meet each other in the position shown in FIG. 9. To allow this angular travel 148 of the inserts relative to each other, the combined length of each pair of anvils has to be less than the length of the composite coil spring 123 when the torque-transmitting devices of the apparatus 101 are in the starting position relative to each other. Also, as was mentioned above in the context of FIGS. 1 through 6, under a preferred concept of the invention the inserts 126 and 127 are designed to work as seals against the escape of lubricant from the chamber that contains the composite coil springs 123.

The recesses 143, 144 and the protuberances 141, 142 extend circumferentially of the apparatus 101. For example, each of the protuberances 141, 142 can constitute a stud which is movable lengthwise of the elongated arcuate recess 143 or 144, as long as the inserts 126, 127 are free to move circumferentially but cannot move radially outwardly relative to the sidewalls 106 and 113. It is immaterial whether the protuberances 141 and/or 142 are provided on the sidewall 106 and/or 113 and the recesses 143 and/or 144 are provided in the inserts 126, 127 or vice versa. In the apparatus 101 of FIGS. 7 to 9, each of the sidewalls 106, 113 is provided with a recess 143, 144 and each of the inserts 126, 127 is provided with at least two protuberances 141, 142 so that is guided by the sidewall 106 as well as by the sidewall 113. When the inserts 126, 127 move in relation to the sidewalls 106, 113, the sliding friction between the inserts 126, 127 and the sidewalls 106, 113 produces a frictional damping effect on movements of the torque-transmitting devices of the apparatus 101 in relation to each other.

The coil springs 145 of the further energy storing elements 140 act as buffers between pairs of neighboring inserts 126, 127. To this end, one (127) of each pair of inserts 126, 127 has a socket 146 in the form of a blind hole which receives a coil spring 145, and the other insert 126 of each pair has a protuberance 147 which can enter the associated socket 146 only upon at least partial stressing of the respective coil spring 145. At least one of the coil springs 145 can be replaced with a suitably configured and dimensioned plug or wad of rubber or other elastomeric material. Furthermore, it is possible to employ composite buffers each of which can include at least one coil spring and/or at least one rubber plug or the like. The dimensions of the protuberances 147 and/or the resiliency of the coil springs 145 in the apparatus 101 determines the magnitude of the force which is required to move two neighboring inserts 126, 127 into full face-to-face contact with each other (i.e., to cause such inserts to assume the positions shown in FIG. 9).

Coil springs 145 which exhibit a high resistance to compression in comparison to the coil springs 123 are capable of bringing about a pronounced damping or braking or intercepting action during certain stages of operation of the apparatus 101 when such apparatus is installed in the power train of a motor vehicle. In addition, the coil springs 145 shield the inserts 126, 127 from abruptly applied and/or pronounced stresses such as could develop if two neighboring inserts 126, 127 were permitted to strike against each other (i.e., to assume the positions shown in FIG. 9) in the absence of the springs 145.

It is often desirable to make the inserts 27 and/or 126, 127 of a material which permits and which can stand a certain amount of elastic deformation. This ensures that, even if two neighboring inserts 27 or 126, 127 (see the inserts 126, 127 shown in FIG. 9) come into full face-to-face abutment with each other, they can still undergo a certain amount of deformation before the angular movement of the respective inserts relative to each other comes to a full end. In other words, the impact of two neighboring inserts against each other is soft or relatively soft because it need not constitute the end of movement of such inserts relative to each other.

The ability of neighboring pairs of inserts (such as 126, 127) to move relative to (toward) each other beyond the positions shown in FIG. 9 can be enhanced by making at least their anvils 129 of an elastically yieldable material or by enabling such anvils to move against each other (beyond the positions shown in FIG. 9) for reasons other than their elasticities. For example, at least one of the anvils 129 can be provided with slits, slots, recesses, cutouts and/or the like.

Still further, and if the energy storing means 22 or 122 consist of sets of successive discrete coil springs (such as the coil springs 23a–23g), it is often advisable to install at least one coil spring of at least one set in a prestressed condition. This is particularly advisable if the coil springs are set up to act as compression springs. It is also possible to install an entire energy storing means 22 or 122 as a compression coil spring, i.e., to ensure that an entire energy storing means consisting of several discrete coil springs (or other suitable discrete springs) acts as a prestressed compression spring. Such mounting of the energy storing means 22 or 122 enhances the resiliency or ability to undergo elastic deformation because this renders it possible to increase the stresses in the wires of which the individual coil springs are made. Still further, such prestressing renders it possible to compensate for setting of the coil springs during the lifespan of the apparatus 1 or 101, i.e., to compensate for setting which necessarily or normally takes place in actual use of the improved apparatus. Last but not least, such prestressing of the coil springs facilitates and simplifies the installation of the energy storing means 22 or 122 in the chamber 14 or 114 of the apparatus 1 or 101.

Unless otherwise stated, the parts of the apparatus 101 are denoted by reference characters similar to those utilized in FIGS. 1 to 6 plus 100. This also applies for the apparatus 201, 301 and 401 respectively shown in FIGS. 10, 11–13 and 14–15 except that the numerals are raised by 200, 300 and 400, respectively.

FIG. 10 shows a portion of a third apparatus 201 wherein the pairs of inserts 226, 227 are provided with profiles 226a, 227a arranged to cooperate in such a way that they increase the resistance of the two torque transmission devices (corresponding to the devices 2, 4 of the apparatus 1) to rotation relative to each other as soon as the two devices complete an angular movement which is required to bring the profiles 226a, 227a into contact with each other. The profiles 226a, 227a are ramps which cause the inserts 226, 227 to be clamped against each other as seen in the radial direction of the apparatus 201. This increases the extent of frictional engagement of the inserts 226, 227 with each other and with the neighboring parts of the apparatus 201, namely with the energy storing means 222 in the chamber 214, the partition 217 and/or the sidewalls (not shown in FIG. 10) corresponding to the sidewalls 6, 13 or 106, 113.

The illustrated profiles 226a, 227a are inclined relative to a plane Y including the axis X of the apparatus 201. This increases the area of contact between pairs of neighboring anvils. Similar results can be obtained if the profiles 226a, 227a are inclined relative to each other and relative to a plane which makes an acute angle with the plane of FIG. 10 and is also inclined relative to the plane Y; this causes the abutting inserts 226, 227 to tend to move in the direction of the axis X, i.e., at right angles to the plane of FIG. 10, namely toward the sidewalls corresponding to the sidewalls 6, 13 or 106, 113.

The apparatus 201 can embody at least some of the features of the previously described apparatus 1 and 101.

FIGS. 11 to 13 illustrate certain details of an apparatus 301 wherein one insert 326 of each pair of inserts 326, 327 is confined in the other insert (327). The latter insert includes a circumferentially complete ring-shaped carrier 345 which is preferably designed to seal the radially inner portion of the annular chamber 314. The illustrated carrier 345 is located between the annular portion 317a of the partition 317 and the adjacent portion of one of the sidewalls 306, 313. This carrier can extend to both sides of the partition 317 which enables the carrier to airtightly or practically airtightly seal the radially inner portion of the annular chamber 314.

The ring-shaped carrier 345 is common to the two illustrated inserts 327 and is radially inwardly adjacent the two inserts 326. However, it is also possible to provide a discrete ring-shaped carrier 345 for each of the inserts 327 and/or to provide a discrete ring-shaped carrier for each of the inserts 326. Still further, it is possible to employ other means for connecting the inerts 326 or 327 to each other, e.g., connecting means which are of one piece with such inserts or which are separately produced parts. Such connecting means ensure movements of the inserts 326 or 327 in synchronism with each other. This at least reduces the likelihood of the development of imbalance.

FIG. 13 illustrates the details of a feature which can be put to use at least in the apparatus 301 of FIGS. 11 and 12. The inserts 326, 327 are biased by energy storing elements 346, 347 which constitute diaphragm springs and serve as a means for increasing or enhancing frictional engagement between the inserts 326, 327 on the one hand, and certain neighboring parts on the other hand. Such neighboring parts include those which are turnable relative to the inserts and/or vice versa.

The diaphragm springs 346, 347 are installed in stressed conditions between the sidewalls 306, 313 on the one hand and the inserts 327, 326 on the other hand (as seen in the direction of the axis X). These diaphragm springs respectively comprise coupling portions 346a, 347a which secure them to the adjacent inserts 326, 327 so that each diaphragm spring is compelled to share the angular movements of the respective (coupled) insert. In addition, the diaphragm spring 346 couples all inserts 327 to each other, and the diaphragm spring 347 couples all inserts 326 to each other to thus ensure that both or all inserts 326, 327 respectively move in at least substantial synchronism with each other. The diaphragm springs 346, 347 enable the apparatus 302 to embody at least one hysteresis arrangement in addition to the damper 315 including the energy storing means 322.

Figures 14, 15:
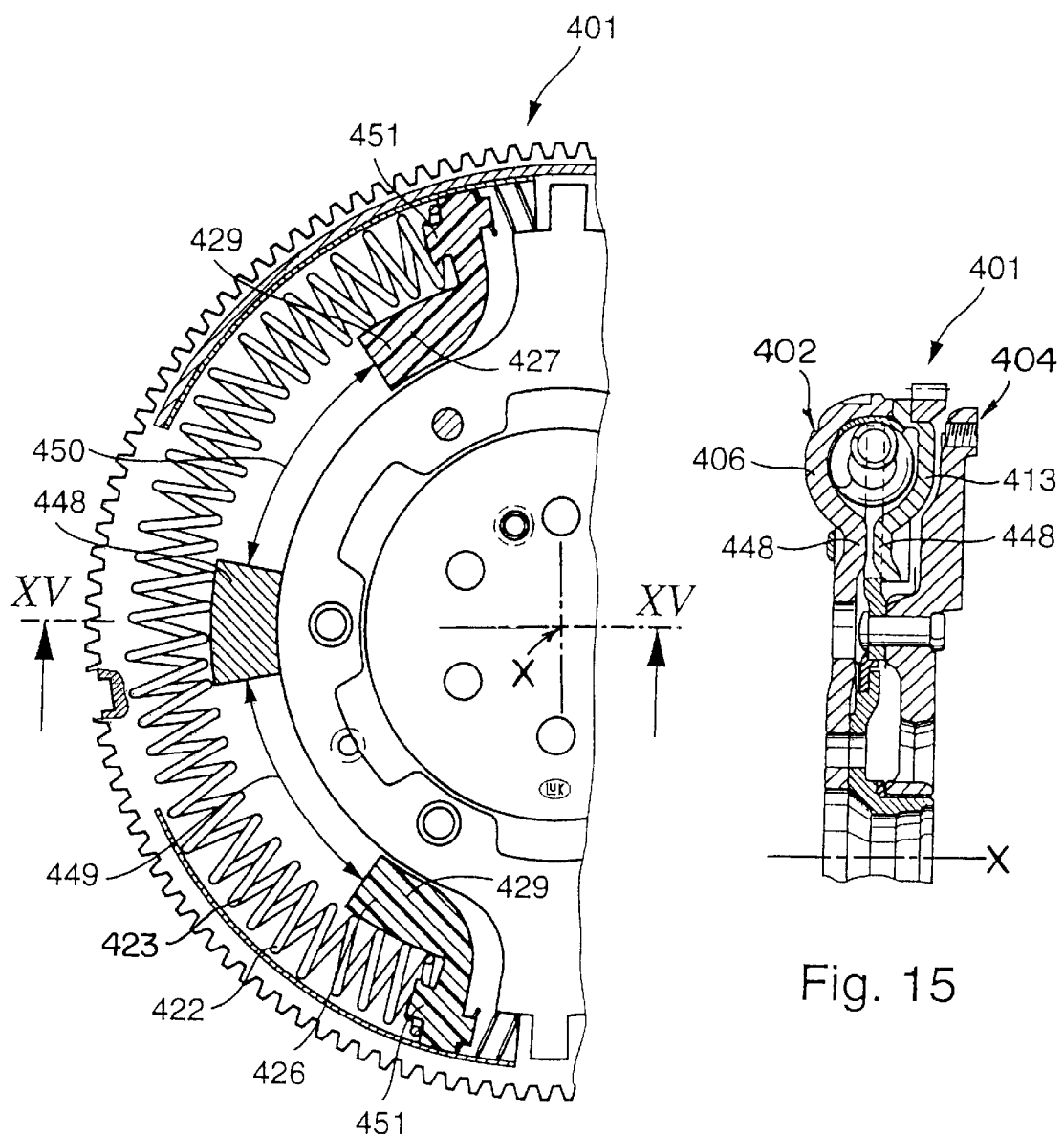
FIG. 14 is a fragmentary transverse sectional view of a fifth torsional vibration damping apparatus.
FIG. 15 is a fragmentary axial sectional view as seen in the direction of arrows from the line XV—XV shown in FIG. 14.

The apparatus 401 of FIGS. 14 and 15 includes inserts 426, 427 which are designed in such a way that they cooperate with protuberances 448 which are provided on at least one of the sidewalls 406, 413. The illustrated protuberances 448 are depressed or displaced or embossed portions of the sidewalls 406, 413. Such arrangement renders it possible to considerably shorten the circumferentially extending anvils 429 of the inserts, i.e., to achieve savings in the material of the parts 426 and 427.

FIG. 14 shows (at 449) the extent to which the inserts 426 and the respective protuberances 448 are movable relative to each other; the inserts 427 and the respective protuberances 448 are movable relative to each other to the extent shown at 450. These extents can be identical or different. It is often advisable to select the extent 449 to exceed the extent 450 if the inserts 427 move relative to the respective protuberances 448 while the motor vehicle is in the process of pulling a load. The inserts 426 then move relative to the respective protuberances 448 while the motor vehicle is caused to travel (roll) along a downwardly sloping surface.

FIG. 14 further shows ring-shaped carriers 451 which connect the inserts 426, 427 to the adjacent end convolutions of the energy storing means 422. The latter is assembled of coil springs 423 which are configured in such a way that the leads or slopes of their end convolutions are at least substantially identical with those of the intermediate convolutions. This renders it possible to obtain individual coil springs 423 of a composite energy storing means 422 by the simple expedient of chopping up an elongated straight or arcuate coil spring into shorter coil springs 423. The configurations of those portions of the inserts 426, 427 which engage the end convolutions of the adjacent coil springs 423 are caused to conform to the shapes and leads of such end convolutions.

If the energy storing means 422 is assembled of a plurality of coil springs 423 exhibiting the aforediscussed characteristics, the ends of the outermost convolutions of the coil springs are preferably positioned or oriented in such a way that the end face of the end convolution of one coil spring contacts the end face of the end convolution of the adjacent coil spring; this ensures that such neighboring coil springs cannot turn or are less likely to turn relative to each other. Those outermost coil springs 423 which directly cooperate with the inserts 426, 427 can be coupled to the respective inserts in a manner to prevent them from turning about their respective longitudinal axes.

The manner in which the carriers 451 can be designed to prevent unintentional separation of the coil springs 423 at the ends of the two energy storing means 422 from the adjacent portions of the respective inserts 426, 427 is analogous to the formlocking connection 31 that is illustrated and described herein in the context of FIG. 5. It is self-evident, that this kind of attachment can likewise be used in the embodiments shown in FIGS. 7 to 13. Furthermore, the same concept is disclosed, for example, in the aforementioned published German patent application Serial No. 196 03 248 A1. The carriers 451 can be much longer than shown in FIG. 14; for example, each thereof can extend all the way through one or more adjacent discrete coil springs.

As already mentioned hereinbefore, at least a portion of each insert can consist of a suitable plastic material, e.g., a thermoplastic or thermosetting or elastomeric material. It is also possible to employ combinations of two or more different plastic materials, e.g., a combination of thermoplastic and elastomeric materials. It is often advisable or necessary to employ a plastic material which exhibits satisfactory mechanical properties at elevated temperatures. As a rule, the material of the inserts should be capable of standing elevated temperatures within a range having an upper limit at about 160° C., preferably at least slightly in excess of 200° C. As concerns the compositions of such materials, and of other materials capable of being put to use in connection with the making of the inserts 27, 126–127, 226–227, 326–327 and 426–427, reference may be had, for example, to pages 215–221 of "Kraftfahrzeugtechnisches Taschenbuch" (translatable as "Pocket edition of terms in the field of motor vehicles") published in 1995 by VDI-Verlag, Düsseldorf, Fed. Rep. Germany (ISBN 3-18-419122-2).

It is further within the purview of the present invention to employ a relatively small number of inserts, e.g., two inserts. For example, the insert 426 or 427 of FIG. 14 can be omitted if the apparatus 401 is provided with a suitable stop which is engaged by the remaining abutment when the two devices 402, 404 complete an angular movement (relative to each other) through a preselected angle (e.g., an angle of not less than 30°). It is presently preferred to employ pairs of inserts in a manner as shown in the drawings. This renders it possible to limit the extent of angular movability of the two torque transmitting devices (such as 402, 404) relative to each other by causing the anvils of the inserts of each pair to strike against each other in a manner as shown, for example, in FIG. 6, 9 or 10.

The deformability of the anvil of at least one of each pair of cooperating inserts (such as the inserts 126, 127 shown in FIG. 9) in response to impact of one of the anvils (129) against the other anvil need not be very pronounced. For example, the anvils 129 can exhibit a resistance to twisting, turning and/or other stresses in the range of between about 50 and 130 Nm/°. Such resistance suffices to ensure that the inserts can stand relatively high impact torques which can develop, under certain specific circumstances, when the improved apparatus is utilized in the power train of a motor vehicle. Such impact torques can correspond to a multiple of torque being normally transmitted by the engine of a motor vehicle to the first torque transmitting device (such as the device 2 shown in FIG. 1) in actual use of the motor vehicle.

The ability of the inserts (such as 226 and 227) to stand the just discussed pronounced impact stresses is desirable on the additional ground that such inserts can contribute to longer useful life of the power train in a motor vehicle and to otherwise contribute to the comfort of utilization of the motor vehicle in a number of ways. These include a pronounced reduction of noise being generated on impact of metallic parts against each other. The afore-enumerated advantages can be achieved by appropriate selection of the material(s) of the inserts, by appropriate selection of additional or auxiliary damper means (see, for example, the springs 30 in the apparatus 1 of FIGS. 1 to 6), by adequate anchoring of the inserts in the energy storing means and/or by adequately guiding the inserts during movement with and relative to the torque transmitting devices.

The resiliency and/or other deformabilities of the inserts can be regulated and/or varied, for example, by appropriate selection of their material(s) and/or by the provision of slots, recesses and/or other configurations which affect the stability of the inserts.

The features of the apparatus 1 can be embodied in the apparatus 101, 201, 301 and/or 401 and vice versa without departing from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of apparatus for damping torsional vibrations in the power trains of motor vehicles and the like and, therefore, such adaptations should and are intended to be comprehended within the meaning and range of equivalence of the appended claims.

What is claimed is:

1. Apparatus for damping torsional vibrations, comprising:
   first and second torque transmitting devices turnable with and relative to each other about a common axis and respectively arranged to receive torque from a rotary output element of a driving unit and to transmit torque to a rotary input element of a driven unit;
   a damper arranged to yieldably oppose rotation of said devices relative to each other and including elastically deformable energy storing means engageable by portions of said devices; and
   inserts interposed between said portions of said devices on the one hand and said energy storing means on the other hand, said inserts having anvils arranged to abut each other in response to turning of at least one of said devices relative to the other of said devices through predetermined angles,
   wherein said energy storing means is disposed at a first radial distance from said axis and said anvils are disposed radially inside of said energy storing means at a lesser second radial distance from said axis.

2. The apparatus of claim 1, wherein each of said devices includes a flywheel.

3. The apparatus of claim 1, wherein said energy storing means includes at least two arcuate resilient components having centers of curvature at said axis and being arranged to permit said devices to turn relative to each other clockwise and counterclockwise from a neutral position through angles of at least 30°.

4. The apparatus of claim 3, wherein said arcuate resilient components include coil springs.

5. The apparatus of claim 4, wherein the coil springs of at least one of said components are arranged to undergo expansion and/or contraction.

6. The apparatus of claim 1, wherein said energy storing means includes at least one arcuate resilient component having a series of coil springs disposed end-to-end.

7. The apparatus of claim 1, wherein said energy storing means comprises at least one elongated precurved coil spring.

8. The apparatus of claim 1, wherein at least a portion of at least one of said inserts consists of a plastic material.

9. The apparatus of claim 1, wherein said energy storing means includes end portions and further comprising means for securing said inserts to said end portions against unintentional separation of said inserts from said energy storing means.

10. The apparatus of claim 1, wherein said energy storing means includes a plurality of elongated arcuate resilient components having centers of curvature at said axis, said inserts including pairs of inserts, one pair for each of said components, and the anvils of at least one of said pairs of inserts being inwardly adjacent the respective resilient component.

11. The apparatus of claim 10, wherein the anvils of said at least one pair of inserts extend along arcuate paths and the anvils of each pair have a combined length less than the length of the respective resilient component in a condition said at least one component assumes in predetermined starting angular positions of said devices relative to each other.

12. The apparatus of claim 11, wherein each of said components has first and second end portions and the inserts of said at least one pair further include radially outwardly extending portions which are adjacent the end portions of said at least one component.

13. The apparatus of claim 12, wherein each of said radially outwardly extending portions exhibits at least some elastic deformability.

14. The apparatus of claim 1, further comprising additional damper means arranged to yieldably oppose turning of said devices relative to each other upon completion of turning of said devices relative to each other through said predetermined angles.

15. The apparatus of claim 14, wherein said damper has a first spring gradient and said additional damper means has a higher second spring gradient.

16. The apparatus of claim 14, wherein said additional damper means exhibits at least one characteristic different from the corresponding characteristic of said damper.

17. The apparatus of claim 1, wherein said inserts are arranged to bear upon at least one of said devices under the action of centrifugal force in response to turning of said devices about said axis.

18. The apparatus of claim 1, wherein one of said devices includes two axially spaced-apart sidewalls extending at least substantially radially of said axis and the other of said devices includes a third wall disposed between said sidewalls.

19. The apparatus of claim 18, wherein said one device is said first device.

20. The apparatus of claim 18, wherein said anvils are arranged to bear upon at least one of said walls under the action of centrifugal force in response to turning of said devices about said axis.

21. The apparatus of claim 1, wherein said inserts are arranged to establish a frictional engagement with at least one of said first device, said second device and said damper, and to thus generate a frictional damping action, at least in response to turning of said devices relative to each other.

22. The apparatus of claim 1, wherein each of said devices includes at least one flywheel rotatable about said axis and said inserts are arranged to oppose wobbling of said flywheels relative to each other.

23. The apparatus of claim 1, wherein one of said devices defines an annular chamber for the energy storing means of said damper, and further comprising a supply of lubricant at least partially filling said chamber, said anvils including portions constituting seals against the escape of lubricant from said chamber.

24. The apparatus of claim 1, wherein said devices are turnable relative to each other in clockwise and counterclockwise directions and said energy storing means includes a plurality of springs disposed end-to-end, said springs including at least one first spring having a first spring rate and being arranged to store energy in response to clockwise turning of said devices relative to each other, and at least one second spring having a second spring rate and arranged to store energy in response to counterclockwise turning of said devices relative to each other.

25. The apparatus of claim 1, wherein said energy storing means includes at least two arcuate resilient components and said inserts further include portions disposed between said resilient components, said portions of said devices includig extensions disposed between said resilient components and further comprising auxiliary springs disposed between said extensions and said portions of said inserts.

26. The apparatus of claim 25, further comprising means for securing said auxiliary springs to said portions of said inserts.

27. The apparatus of claim 26, wherein said securing means includes form-locking connections.

28. The apparatus of claim 25, wherein said devices are turnable relative to each other in clockwise and counterclockwise directions, said auxiliary springs being arranged to store energy in response to turning of said devices relative to each other in one of said clockwise and counterclockwise directions.

29. The apparatus of claim 25, wherein said devices are turnable relative to each other in clockwise and counterclockwise directions, said auxiliary springs including at least one first spring arranged to store energy in response to clockwise turning of said devices relative to each other and at least one second spring arranged to store energy in response to counterclockwise turning of said devices relative to each other.

* * * * *